Figure 5:
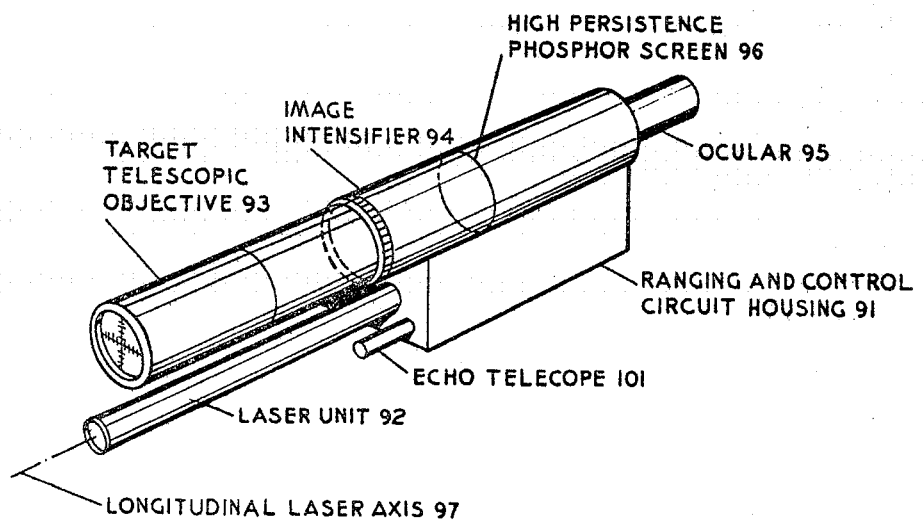

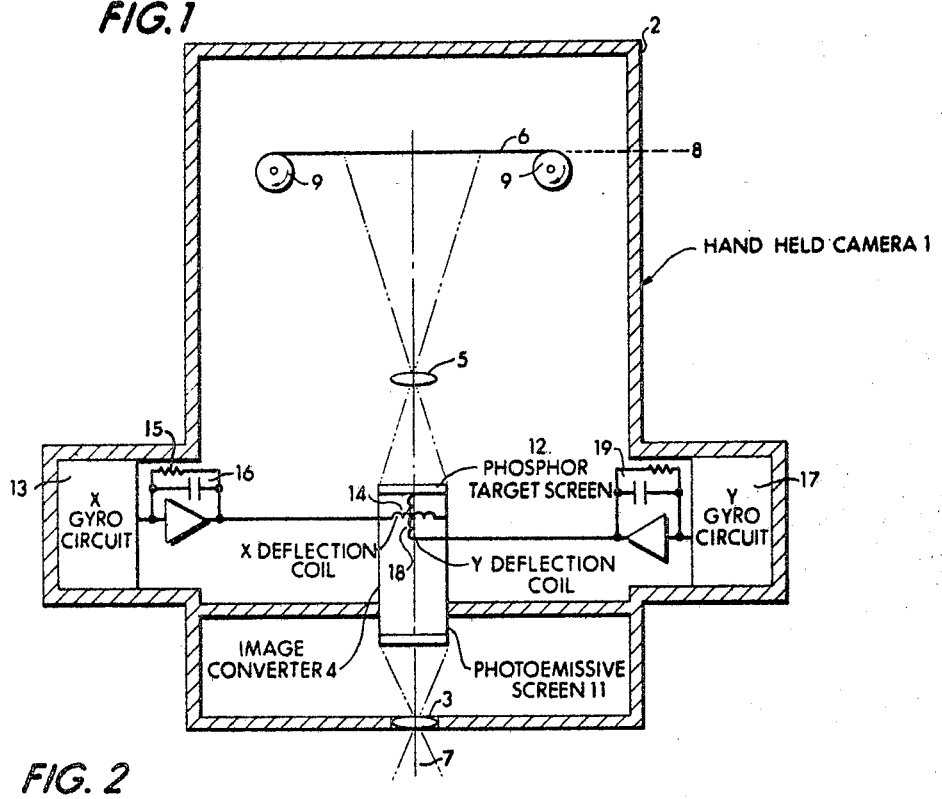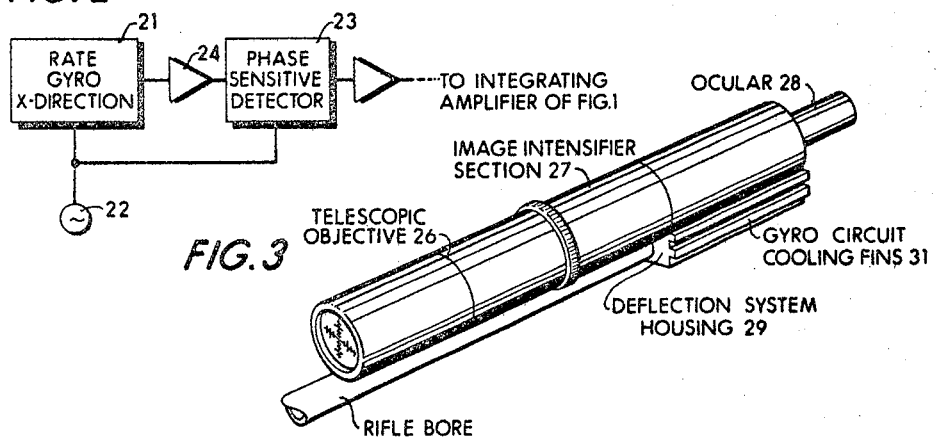

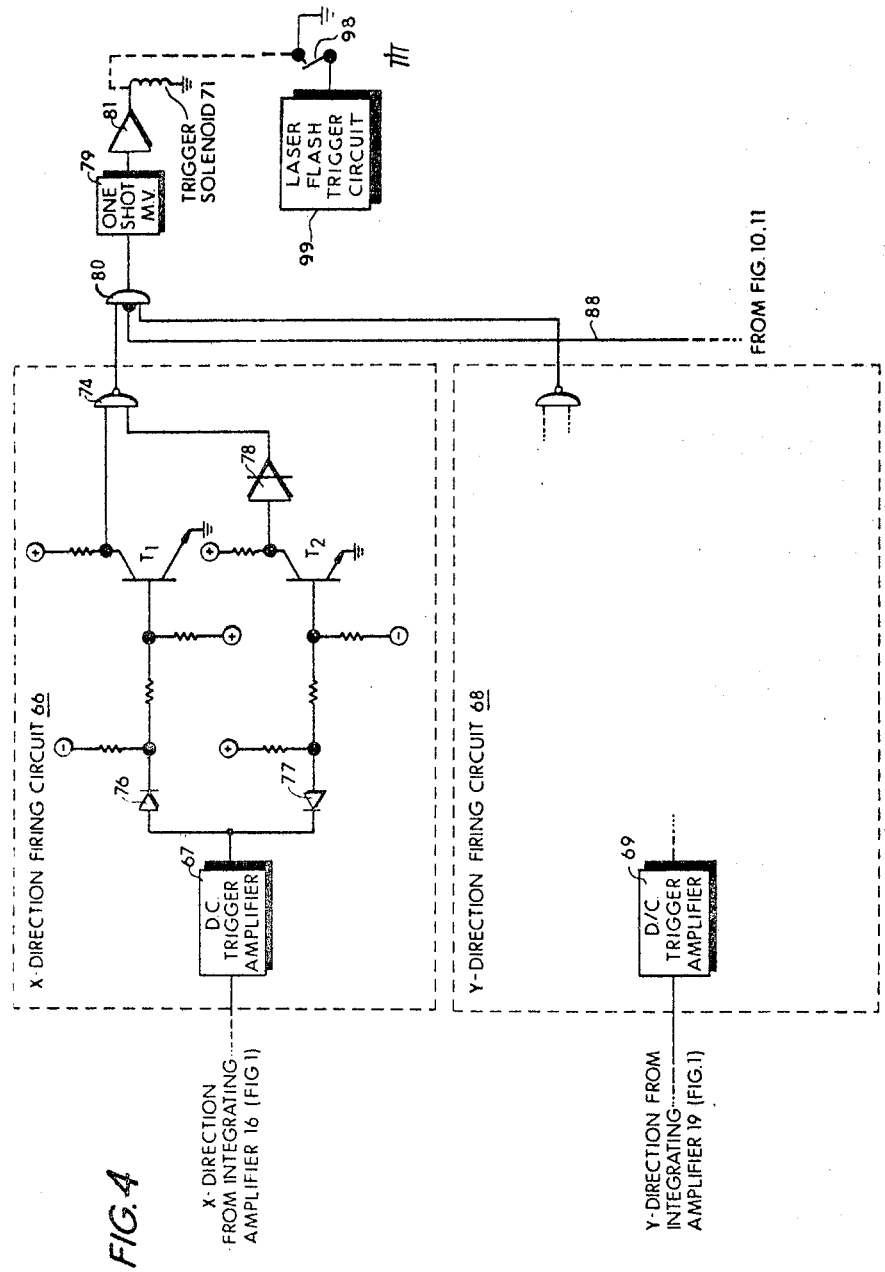

United States Patent Office 3,435,227
Patented Mar. 25, 1969

3,435,227
STABILIZATION SYSTEM FOR A LASER
RANGEFINDER
Efraim R. Arazi, Cambridge, Mass., assignor to Itek Corporation, Lexington, Mass., a corporation of Delaware
Filed Dec. 15, 1965, Ser. No. 513,960
Int. Cl. H04b 9/00
U.S. Cl. 250—199
12 Claims The present invention relates to rangefinders and more particularly to rangefinders which utilize the transmission of light to measure distances.

A laser rangefinder is a device which transmits a narrow coherent beam of light at a target at a first instant of time and records the resulting echo at a second instant of time. Since the speed of light is constant, the interval between the first and second instant is, therefore, indicative of the range of the object returning the echo to the rangefinder. Such a beam does not disperse, owing to its coherent nature, and is extremely intense when generated during a short time interval. Because of these characteristics, an echo of such a beam may be readily detected while the echo time may be accurately measured. Additionally, since a monochromatic beam may be generated, a filter may be utilized to exclude most ambient light, and the device may, therefore, be used in bright daylight.

However, since the beam is very narrow, a considerable number of beams must usually be transmitted before a particular beam hits the target and numerous erroneous readings are often recorded causing confusion, which confusion is compounded by the fact that the operator is never sure whether the beam has actually hit the target. Furthermore, if a target range is to be obtained quickly, which is generally the case in military applications, a cluster of lasers must be provided and time shared. This is necessary because only a few bursts of light may be generated by any particular laser during a short time interval. The provisions of such a cluster of lasers is not only expensive, but renders the rangefinder less portable and more difficult to transport from one location to another.

Accordingly, it is a principal object of the present invention to provide a new and improved light beam rangefinder.

It is a further object of the present invention to provide a new and improved light beam rangefinder which is extremely accurate and will thus indicate the range of a desired object in a very short time.

It is a further object of the present invention to provide a new and improved light beam rangefinder which is inexpensive, lightweight, and portable.

It is yet a further object of the present invention to provide a new and improved light beam rangefinder which can readily inform the operator if the target has in fact been hit by a particular light beam.

Other objects and advantages of the present invention will become apparent as the following description, taken in conjunction with the attached drawings, proceeds.

FIGURE 1 discloses an overall schematic of the image motion stabilizing circuit.

FIGURE 2 discloses a gyroscope circuit of FIGURE 1.

FIGURE 3 discloses the image motion stabilization system used in conjunction with the fire control circuitry of a rifle, which will aid in understanding the present invention.

FIGURE 4 discloses details of the control circuit for firing the laser flash tube trigger circuit.

FIGURE 5 discloses an overall schematic of the rangefinder of the present invention.

In accordance with the present invention, a laser is affixed to a circuit housing which includes ranging, image motion stabilization, and fire control circuitry. A target viewing unit is affixed to the aforesaid housing which unit comprises a target telescopic objective which focuses the image of the target scene upon the photomissive screen of an image intensifier tube. Electron streams are produced thereby within the image intensifier tube and strike a moderately high persistence phosphor screen (e.g., 0.5 to 10 seconds) to reconvert the scene image back into an optically visible image which is viewed by an ocular. Small random vibrations of the system support, which could include a human being or a moving vehicle, cause image motion to be produced, which in turn makes it difficult for the observer to accurately sight the exact object of interest. The random motions of the system, which cause image motion or "dance," are converted into $x$ and $y$ electrical signals which are proportional to the direction and degree of instantaneous displacement of the optical system from the target axis, i.e., the line between the object and the system itself. These signals are applied to a deflection system which causes the electron image bundle generated within the image converter to be subjected to deflection forces by an amount and in a direction to stabilize the bundle and cancel that image motion which would otherwise occur due to these motions in the absence of the deflecting system. When these angular displacements are zero in both the $x$ and the $y$ direction the system is on target. For instance, in the case of electromagnetic deflection coils, a zero current state in both $x$ and $y$ coils is electronically detected to indicate that the sighting system is on target.

Patent application Ser. No. 462,322, filed June 8, 1965, and assigned to the same assignee as the present invention, discloses and describes in detail circuitry which utilizes this electrical condition to fire a rifle. This condition is utilized in the present invention to actuate the flash tube of a laser, thereby to transmit a coherent beam of light to a target whose range is to be measured. As a result of employing these sophisticated stabilization and fire control circuits along with a narrow, powerful, coherent light beam produced by a laser, a large number of flashes will not be necessary in order to hit the target. The rebounding light, or echo, is picked up by an echo telescope affixed to the ranging and stabilization circuit housing, and the time instant at which this occurs is accurately compared with the time instant at which the light was directed to the target by the laser. This interval will, therefore, indicate the range of the desired object. It is an important feature of the present invention that a moderately high persistence phosphor screen is utilized at the output portion of the image intensifier tube, so that the echo beam is stored on the face of the tube as a bright spot along with the electronically stabilized viewed scene. The operator can thereby almost immediately easily tell whether or not the target object reflected the beam or whether the beam has struck some other object which, of course, would indicate a miss condition.

In order to readily comprehend the stabilization and fire control circuitry of the rangefinder, reference will now be made to FIGURES 1–4. FIGURE 1 discloses a camera 1, which could be hand-held, having a light tight case 2 and an objective lens 3 postioned at one of the case, as shown. An image converter or intensifier tube 4, focusing lens 5, and film 6, are positioned along optical axis 7 as shown. Film 6 is positioned within focal plane 8 and is supported and actuated by rollers 9. Image converter tube 4 and focusing lens 5 are, of course, affixed to case 2.

A scene to be photographed is imaged upon photoemissive screen 11 by lens 3. As photons strike the photoemissive screen 11, coated on the inside of the evacuated envelope of the image converter, several electrons are emitted for each photon. Focusing and accelerating electrodes, not shown, but contained within image converter 4, cause the electron bundle composed of a number of electron streams to be focused upon phosphor target screen 12. Since the intensity of the electron streams emitted by incremental areas of the photoemissive screen are proportional to the intensity of light falling upon these incremental areas, it follows that the total electron bundle making up the numerous electron streams, represents the viewed scene, and will be reconverted into an optical image by the phosphor target screen, 12. In the preferred embodiment of the present invention, the optical image focused upon screen 11 will be amplified owing to the acceleration of the electron streams within the image converter or image intensifier 4. However, the image need not necessarily be amplified. For a discussion of various types of image converters see Van Nostrand's Scientific Encyclopedia, third edition, January 1958, page 860.

An $x$ direction rate gyro circuit 13, is electrically coupled to magnetic deflection yoke 14, which is associated with image converter 4, through integrating amplifier 16. Likewise, $y$ direction rate gyro circuit 17 is coupled to $y$ direction magnetic deflection yoke 18 through integrating amplifier 19.

Gyro circuits 13 and 17 are well known to those skilled in the art. FIGURE 2 schematically discloses the major components of gyro circuits 13 and 17, however.

It should be appreciated at this point that the aforesaid image motion or "dance," which is to be cancelled out, is due primarily to angular motion of camera 1 about optical axis 7. As mentioned hereinbefore, the angular $x$ and $y$ direction motions of camera 1 are detected by transducer means associated with the camera, and cause electrical fields to be set up within image converter 4, by an amount and in a direction to cancel the "dance" effect which would otherwise be produced in the absence of the deflecting means. Accordingly, the gyro circuits 13 and 17 together with their associated integrating amplifiers 16 and 19 cause currents to pass through yokes 14 and 18 proportional to angular displacement of the camera axis. The $x$ direction rate gyro, 21, of FIGURE 2 is supplied with a 400 cycle, 26 volt, carrier signal produced by AC generator 22. The output of the gyro is applied to a phase sensitive detector, 23, via amplifier 24. The phase sensitive detector, 23, is also supplied with a reference signal which is the same as that signal applied by AC source 22 to rate gyro 21. The amplitude modulated carrier applied to phase sensitive detector 23 by the rate gyro will be amplitude modulated in accordance with the instantaneous angular velocity of the camera with respect to the gyro axis. The direction of the angular velocity will be indicated by the relative phase of the AM carrier produced by rate gyro 21 with respect to the reference signal applied to detector 23. In other words, as the angular velocity of the gyro increases in a first direction with respect to the camera case 2, the amplitude of the low frequency detected signal increases but is still positive. On the other hand, if the angular velocity direction is reversed, a negative signal will be produced by detector 23, the amplitude of which is proportional to the instantaneous angular velocity of the gyro with respect to case 2. Accordingly, it should be appreciated that the output of detector 23 produces an AC voltage wave shape which represents instantaneous angular velocity against time, which wave shape which will be both positive and negative depending on the instantaneous direction of the angular velocity of motion of the case with respect to the gyro axis. As is also well known to those skilled in the art, the integration of such a wave shape produces a wave shape which represents the instantaneous position of the case with respect to the gyro axis, both to the left and to the right of the null position. Accordingly, it should be understood that the instantaneous position of the camera case about a null, "home," or "on target" position will cause an electrical field to be set up within image converter 4, proportional to such deviation. Thus, the electron image within the converter becomes "frozen." Of course, the $y$ direction gyro circuit, 17, would be identical with $x$ gyro circuit 13, so that the composite "pitch" and "yaw" deviations of the camera case about the "target" viewing position will enable image motion or "dance" to be completely cancelled out. The resulting photographs have been clear and distinct where they would otherwise have been smeared beyond recognition.

It should be understood that, if desired, electrostatic deflection plates may be utilized in converter or image intensifier 4 in place of the magnetic deflection yokes. However, the use of magnetic deflection yokes is preferable in view of the elimination of high voltage power supplies. It should also be understood that while image converter 4 may act as an optical image intensifier, light amplification by means of the operation of image converter 4 is not essential where the scene to be viewed is sufficiently bright. The actual image tube utilized in one camera built by the inventor was an RCA C33004B (development type). The yokes were produced by Syntronics Instruments, Incorporated, Model Number C344OY19580. The gyro was a U.S. Time model 60 while the amplifiers were Philbrick P65/A operational amplifiers.

A terrestrial telescope was built and is schematically shown in FIGURE 3. The telescope comprises telescopic objective 26, image converter or intensifier section 27, ocular 28, and the deflection system housing 29, which includes the gyroscopes. Cooling fins 31 were formed on the outside of housing 29 in order to provide for gyroscope cooling. Owing to telescopic objective 26, distant objects are viewed by the telescope and, therefore, it should be apparent that slight angular motions of the telescope will cause the image viewed by the observer by means of ocular 28 to "dance" about. An electronically stabilized telescope will elminate this "dance," so that details of the distant scene being viewed by the telescope may be rapidly and readily discerned without the accompanying operator fatigue which occurs through the use of standard telescopes. The telescopic objective, 26, focuses the distant scene upon the photoemissive screen of image intensifier tube, and the ocular 28 focuses the image produced by the phosphor target screen at the retina of the observer, or, in the alternative, at a photographic plate. This embodiment is otherwise similar to FIGURE 1.

Frequently, the hand-held camera disclosed in the FIGURE 1 embodiment, the terrestrial telescope shown in FIGURE 3, and cameras mounted upon various vehicles are slowly panned, i.e., their longitudinal axes are angularly rotated to follow a moving object, for instance, or to view a different portion of the earth's surface. In the case of the hand-held camera, the longitudinal axis will never be angularly rotated to follow a moving object above 2 cycles per second. However, in order to prevent this very low frequency oscillation from affecting the current in the deflection coils, thereby to displace the entire field of view, a "leaky" integrator was developed. In order to prevent integrator circuit 16 from responding to the positioning of the camera which would cause gyro 21 to produce frequencies below 2 cycles, a resistor, 15, is connected in shunt with the integrating capacitor of integrating circuit 16, as shown in FIGURE 1. The value of the resistor is chosen relative to the value of the capacitor such that the integrator capacitor will not charge due to currents produced by signals applied thereto below 2 cycles per second. In other words, the resistor will drain the capacitor to prevent charging at these frequencies. Where a one microfarad integrating capacitor was utilized in conjunction with a Philbrick P65 operational amplifier, a satisfactory value of resistor 15 was found to be 500 ohms.

By the employment of a telescope such as that shown in FIGURE 2, and by use of additional electronic circuitry such as disclosed in FIGURE 4, a novel electronic gunsight and automatic firing control system may be fabricated. Crosshairs are provided within objective 26 or elsewhere in the optical train on the target side of the image converter. The telescope is mounted on a weapon such as a rifle. In the absence of the aforesaid teachings, the point of intersection of the crosshairs will "dance" about the target in response to random motion of the weapon due either to body motion of the individual aiming the weapon or to the movement of a vehicle upon which the individual is being carried. With the telescope of FIGURE 2, this "dance" will cease and the crosshairs will appear stationary with respect to the target scene, since the crosshair image will form part of the target image applied to the photoemissive screen of the image converter. However, the longitudinal axis of the rifle bore is still randomly and angularly gyrating about the target axis, which may be described as the straight line between the actual target and the bullet in the bore situated at the firing position. As explained in detail hereinbefore, when the angular deviation of the longitudinal axis of the optical system with respect to the "home" position is zero in both the $x$ and $y$ directions, the integrating amplifiers will produce zero voltage outputs so that no current flows in the $x$ and $y$ deflection coils. At some instant during the aforesaid period of angular gyration of the longitudinal axis of the bore of the weapon about the target axis, the bore axis and target axis will coincide and the aforementioned zero voltage conditions at the output of both the $x$ and $y$ integrating amplifiers will occur. This condition is virtually instantaneously sensed electronically, and a sharp pulse is applied to a firing device such as a trigger solenoid. Statistically speaking, this "on target" voltage condition should occur very shortly after the initial sighting of the target. It is conceivable that this condition could also be sensed by the detection of a lack of magnetic or electric field within the image intensifier, rather than utilizing the zero output voltages at both of the integrating amplifiers to make this determination.

An optional inhibiting circuit is also provided for preventing the energization of the trigger solenoid, even though the aforesaid zero voltage conditions are present at the output of both $x$ and $y$ integrating amplifiers. The inhibition of the actuation of the trigger solenoid will be produced, unless a minimum trigger pressure exists upon the trigger, indicating that the individual handling the firearm is set and does intend to actually fire the weapon at this time. Additionally, should the angular velocity of the longitudinal axis of the bore be greater than a predetermined amount, an inhibit condition is produced which prevents energization of the trigger solenoid. Where the angular velocity of the weapon is quite high, it may be seen that by the time the bullet emerges from the barrel, the bore axis and the target axis will be slightly but significantly displaced from one another, so that the target might be missed, particularly if the target is small; or putting it another way, the bullet direction as it emerges from the bore will be slightly but significantly different from the direction of the bullet axis upon being fired.

The telescope of FIGURE 3 is mounted upon a weapon such as a rifle and the circuitry to be discussed hereinafter is added to the basic system of FIGURES 1–3.

FIGURE 4 discloses the $x$ and $y$ direction firing circuits together with circuitry responsive to each firing circuit for actuating a trigger solenoid, which fires the weapon. The $x$ direction firing circuit 66 is coupled to the output circuit of $x$ direction integrating amplifier 16 while $y$ direction firing circuit 68 is coupled to the output circuit of $y$ direction integrating amplifier 19. The purpose of $x$ and $y$ direction firing circuits 66 and 68 is to set the stage for the actuation of trigger solenoid 71 when the aforementioned zero deflection condition is present within the image intensifier 2, thereby to indicate that the longitudinal bore axis of the weapon is coincident with the target axis. DC trigger amplifiers 67 and 69 may be any amplifiers having "snap action" voltage trigger characteristics. When the output voltage of an integrating amplifier becomes more postitive than a point slightly greater than zero, the output voltage of the trigger amplifier will sharply rise to a relatively large positive voltage. On the other hand, should the negative voltage produced by the integrating amplifier output exceed a voltage slightly greater than zero, the output voltage of the trigger amplifier will go sharply negative. This type of double trigger amplifier is readily available. Type D–9505 operational amplifier, manufactured by Signetics Integrated Circuits of Sunnyvale, Calif., may be utilized. If desired, twin Schmitt triggers may be utilized in place of such an amplifier, as is well known to those skilled in the circuit design field.

The electronic circuitry of FIGURE 4 is a logic circuit which will, under certain conditions other than the coincident production of the "zero" voltage conditions at the output circuits of the integrating amplifiers, cause energization of trigger solenoid 71.

The $x$ and $y$ direction firing circuits 66 and 68 will cause a mark to be produced by nand (nor-and) gate 74 upon the simultaneous production of the "zero" voltage condition at the output circuits of the integrating amplifiers, which as explained earlier indicate the coincidence of the longitudinal bore axis of the weapon with the target axis. The "ground" trigger amplifier output is the firing range area and is indicative of the "zero" output voltage condition. A mark (positive) will be produced by nand gate 74 only where the ground or "zero" voltage condition is simultaneously present at the trigger amplifier outputs.

A ground condition at the output circuit of DC trigger amplifier 67 causes N-P-N transistor T–1 to assume the conductive or "on" condition. Diode 76 becomes forward biased so that the voltage at the base of transistor T–1 goes positive with respect to the emitter. This ground condition at the output circuit of trigger amplifier 67 also forward biases diode 77, which causes the base of transistor T–2 to go negative with respect to the emitter, to cause N-P-N transistor T–2 to assume the "off" condition. With T–1 in the "on" condition, ground (no mark) is applied to the first input terminal of nand gate 74. With T–2 "off," a positive voltage is applied to inverter 78, which also produces a ground (no mark) condition at the second input terminal of nand gate 74. Under these conditions, and only under these conditions, a positive mark will be produced at the first input terminal of and gate 80 (as nand gate 74 is fully enabled), thereby to partially enable gate 80. In like manner, the production of a ground or "zero" voltage at the output terminal of DC trigger amplifier 69 causes a positive mark to be produced by $y$ direction firing circuit 68 at the second input terminal of and gate 80, thereby to further enable this and gate. Excluding for a moment the function of the inhibit terminal of and gate 80, it should now be seen that the simultaneous production of "zero" voltage conditions at the output circuits of the integrating amplifiers will cause and gate 80 to be fully enabled, thereby to actuate a one shot multivibrator, 79, which in turn energizes amplifier 81 to operate trigger solenoid 71. Details of the $y$ direction firing circuit 68 have been omitted, since this circuit is identical with $x$ direction firing circuit 66. Should a positive voltage output be produced by trigger amplifier 67, T–1 will be turned on and T–2 will also be turned on. Under these conditions inverter 78 will cause a positive voltage to be applied to the second input terminal of nand gate 74, and as a result no mark may be produced by the nand gate at this time; thus and gate 80 is enabled and trigger solenoid 71 may not be actuated. On the other hand, should the output voltage of trigger amplier 67 be negative, T–1 will be "off" and a positive voltage (mark) is applied to the first input terminal of nand gate 74, thereby to prevent the production of a mark at the output terminal of the nand gate.

Further refinements of the electronic image motion stabilization system and the fire control system may be found in the aforesaid copending application assigned to the same assignee as the present invention.

A typical laser range finding system which may be utilized in the present invention is disclosed in Masers and Lasers, published in 1962 by Maser/Laser Associates (pages 156 and 159). As disclosed therein, the actuation of a firing switch causes a high voltage to be applied to the laser flash tube, which in turn causes the laser to produce a narrow and intense coherent beam of light which passes through a lens and a beam splitter and is directed toward the object whose range is to be determined. This beam also rebounds off of the beam splitter and passes through a monochromatic filter and is detected by a photomultiplier which applies a signal to the deflection plates of an oscilloscope, to thereby indicate the instant of time at which the laser beam is directed toward the target. The echo beam is detected by a telescope acting in conjunction with a monochromatic filter and a photomultiplier tube which causes a signal to be applied to the vertical deflection plates of an oscilloscope, to thereby indicate the instant of arrival of the echo. By comparing the spacing between the two signals, it is apparent that the range may be determined thereby, since the sweep velocity and the speed of light is known. The monochromatic nature of the light produced by the laser beam and the use of the aforesaid filters allows the rangefinder to be utilized in broad daylight. Where a portable system is utilized in the field, the oscilloscope may be bulky and difficult to handle, and not as rugged as a digital counting device; therefore, such a device would be more desirable for this particular application. The first signal produced by the light beam transmitter could actuate a flip-flop to enable a gate which would feed pulses generated by a clock pulse source into an electronic counter. The echo pulse could cause the flip-flop to become reset, thereby to prevent further pulses from entering the counter, and the count in the counter could be read out directly. Also, it is possible that the aforesaid filters could be infrared, and the area could be illuminated with infrared light so that the rangefinder could operate during periods of darkness.

The word light used herein is intended to cover ultraviolet and infrared radiation.

The aforesaid Electronic Image Motion Stabilization system, together with the fire control system, is incorporated into housing unit 91 of the laser rangefinder schematically disclosed in FIGURE 5. The aforesaid laser rangefinding system is also enclosed in housing 91, while laser unit 92 is affixed to the housing as shown. The viewing unit comprising the target telescopic objective 93, image intensifier section 94, and ocular 95 correspond to the sighting system of FIGURE 3. However, the image intensifier section, 94, has a high persistence phosphor screen 96, for presenting an optical image of the target to ocular 95. The entire system of FIGURE 5 could, of course, be mounted on a gunstock or some other appropriate support.

The ranging system is operated by panning it until the crosshairs are placed directly over the target. In the absence of electronic image motion stabilization, image motion or "dance" will be produced in the telescopic objective as the longitudinal laser axis 97 gyrates about the target axis. These gyrations not only cause optical sighting to be difficult, but cause the laser to miss the target as discussed hereinbefore. The aforesaid Electronic Image Motion Stabilization system causes the optical scene to be "frozen" or stabilized so that, even though the longitudinal laser axis 97 is angularly gyrating about the target axis, the target will appear stationary in the ocular 95. The angular displacements of the laser axis with respect to the target axis produce displacement signals which are applied to the deflection circuitry to stabilize the image. Also, as described previously, when the zero current or voltage condition is manifested in both the $x$ and $y$ deflection means, the indication is that the laser axis, or in the case of the rifle, the bore axis, is coincident with the target axis, and the fire control system triggers the firing device. The firing condition causes switch 98, shown in FIGURE 4, to become actuated, thereby to in turn cause laser flash circuit 99 to energize the laser. While the trigger device has been shown as a solenoid in FIGURE 5, it is obvious that the output from one shot multivibrator 79 could be utilized to electronically actuate the laser flash circuit 99 for higher speed operation. The echo beam would be detected by echo telescope 101, which would establish the ranging interval as discussed hereinbefore. It is quite possible that the echo signal could be detected by a photodetector coacting with the phosphor screen, 96, since the echo will be manifested by a sharp, bright echo spot thereon, to eliminate the need for an additional echo telescope as shown in FIGURE 5. It is an important feature of the present invention that the echo spot is stored for a brief period, e.g., a few seconds, on the phosphor screen 96. If the light beam has in fact hit the target, the bright echo spot will be superimposed upon the target image. On the other hand, if the laser beam has actually missed the target, which will not occur very often due to the electronic fire control circuitry, the echo spot will not be superimposed upon the target image, but will be superimposed upon the image of the reflecting body. Verification, or "human feedback" is thus usually obtainable in a very short interval of time. The phosphor persistence should not be too high, since this could interfere with panning or changing of the field of view.

While there has been described what is at present considered to be the preferred embodiment of this invention, it will be obvious to those skilled in the art that various changes and modifications may be made therein without departing from the invention, and it is, therefore, intended in the appended claims to cover all such changes and modifications as fall within the true spirit and scope of the invention.

What is claimed is:
1. In combination:
   (a) a rangefinder including a light beam generator having a longitudinal axis for directing a beam of light at a target along a given target line and further including means for measuring the time interval between the time of generation of a light beam portion and the time of arrival of the resulting target echo;
   (b) viewing means for viewing the image of said target;
   (c) photosensitive imaging means for presenting an image of said target to said viewing means;
   (d) indicating means for producing signals indicative of the degree of displacement of the longitudinal axis of said light beam generator away from said given target line;
   (e) deflection means for deflecting the image produced by said photosensitive imaging means in response to said signals indicative of said degree of displacement produced by said indicating means in a direction to cancel components of image motion which would otherwise be caused by the aforesaid displacement; and
   (f) means responsive to the lack of displacement of the longitudinal axis of said light beam generator from said given target line for causing said light beam generator to generate said beam of light.

2. The combination as set forth in claim 1 wherein said light beam generator comprises a laser for generating a narrow coherent beam of light.

3. The combination as set forth in claim 1 wherein said viewing means includes means for storing a replica of said target echo.

4. The combination as set forth in claim 3 wherein said viewing means comprises a high persistence luminescent screen.

5. In combination:
   (a) a rangefinder including a light beam generator having a longitudinal axis for directing a beam of light at a target along a given target line and further including means for measuring the time interval between the time of generation of a light beam portion and the time of arrival of the resulting target echo;

(b) viewing means for viewing the image of said target;
(c) photosensitive imaging means fixed with respect to said light beam generator and movable therewith for presenting an image of said target to said viewing means;
(d) indicating means for producing signals indicative of the degree of displacement of the longitudinal axis of said light beam generator away from said given target line;
(e) deflection means for deflecting the image produced by said photosensitive imaging means in response to said signals indicative of said degree of displacement produced by said indicating means in a direction to cancel components of image motion which would otherwise be caused by the aforesaid displacement; and
(f) means responsive to the lack of displacement of the longitudinal axis of said light beam generator from said given target line for causing said light beam generator to generate said beam of light.

6. The combination as set forth in claim 5 wherein said light geam generator comprises a laser for generating a narrow coherent beam of light.

7. The combination as set forth in claim 5 wherein said viewing means includes means for storing a replica of said target echo.

8. The combination as set forth in claim 7 wherein said viewing means comprises a high persistence luminescent screen.

9. In combination:
(a) a rangefinder including a light beam generator having a longitudinal axis for directing a beam of light at a target along a given target line and further including means for measuring the time interval between the time of generation of a light beam portion and the time of arrival of the resulting target echo;
(b) an image converter having a photoemissive surface at one portion thereof for producing an electron stream corresponding to said target and a luminescent screen at another portion thereof for reconverting said electron stream into an optical image;
(c) means for imaging said target at said photoemissive screen;
(d) indicating means for producing signals indicative of the degree of displacement of the longitudinal axis of said light generator away from said target line;
(e) deflection means for deflecting said electron stream produced by said photoemissive surface in response to said signals indicative of said degree of displacement produced by said indicating means in a direction to cancel components of image motion which would otherwise be caused by the aforesaid displacement; and
(f) means responsive to the lack of displacement of the longitudinal axis of said light beam generator from said given target line for causing said light beam generator to generate said beam of light.

10. The combination as set forth in claim 9 wherein said luminescent screen comprises means for storing a replica of said target echo.

11. The combination as set forth in claim 10 wherein said luminescent screen comprises a high persistence phosphor.

12. The combination as set forth in claim 9 including means for maintaining the position of said image converter and said rangefinder in a fixed relationship.

References Cited

UNITED STATES PATENTS

| | | | |
|---|---|---|---|
| 3,296,443 | 1/1967 | Argyle | 250—203 |
| 3,330,958 | 7/1967 | Kaisler et al. | 250—203 |
| 3,378,687 | 4/1968 | Schepler | 250—203 |
| 3,381,133 | 4/1968 | Barnes et al. | 250—203 |

ROBERT SEGAL, *Primary Examiner.*

C. R. CAMPBELL, *Assistant Examiner.*

U.S. Cl. X.R.

250—202; 88—1